C. C. ABBOTT.
CUMULATIVE VOTING MECHANISM.
APPLICATION FILED JULY 8, 1908.

914,009.

Patented Mar. 2, 1909.
4 SHEETS—SHEET 1.

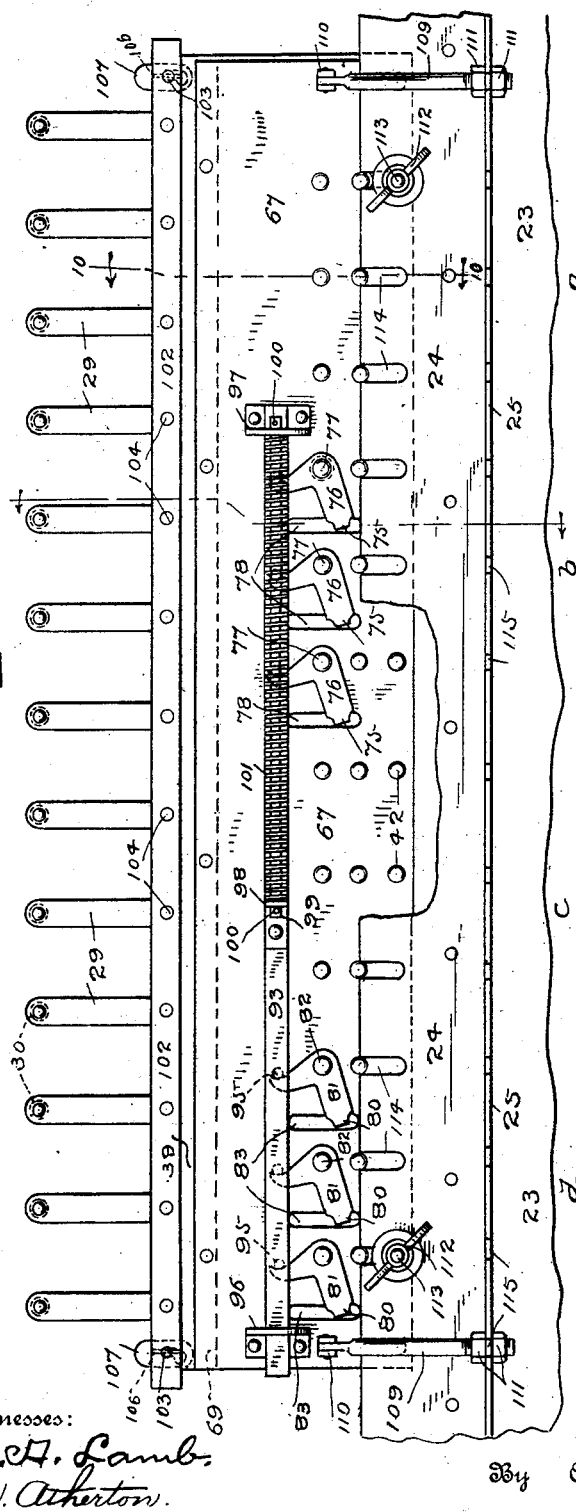

C. C. ABBOTT.
CUMULATIVE VOTING MECHANISM.
APPLICATION FILED JULY 8, 1908.
914,009.
Patented Mar. 2, 1909.
4 SHEETS—SHEET 3.
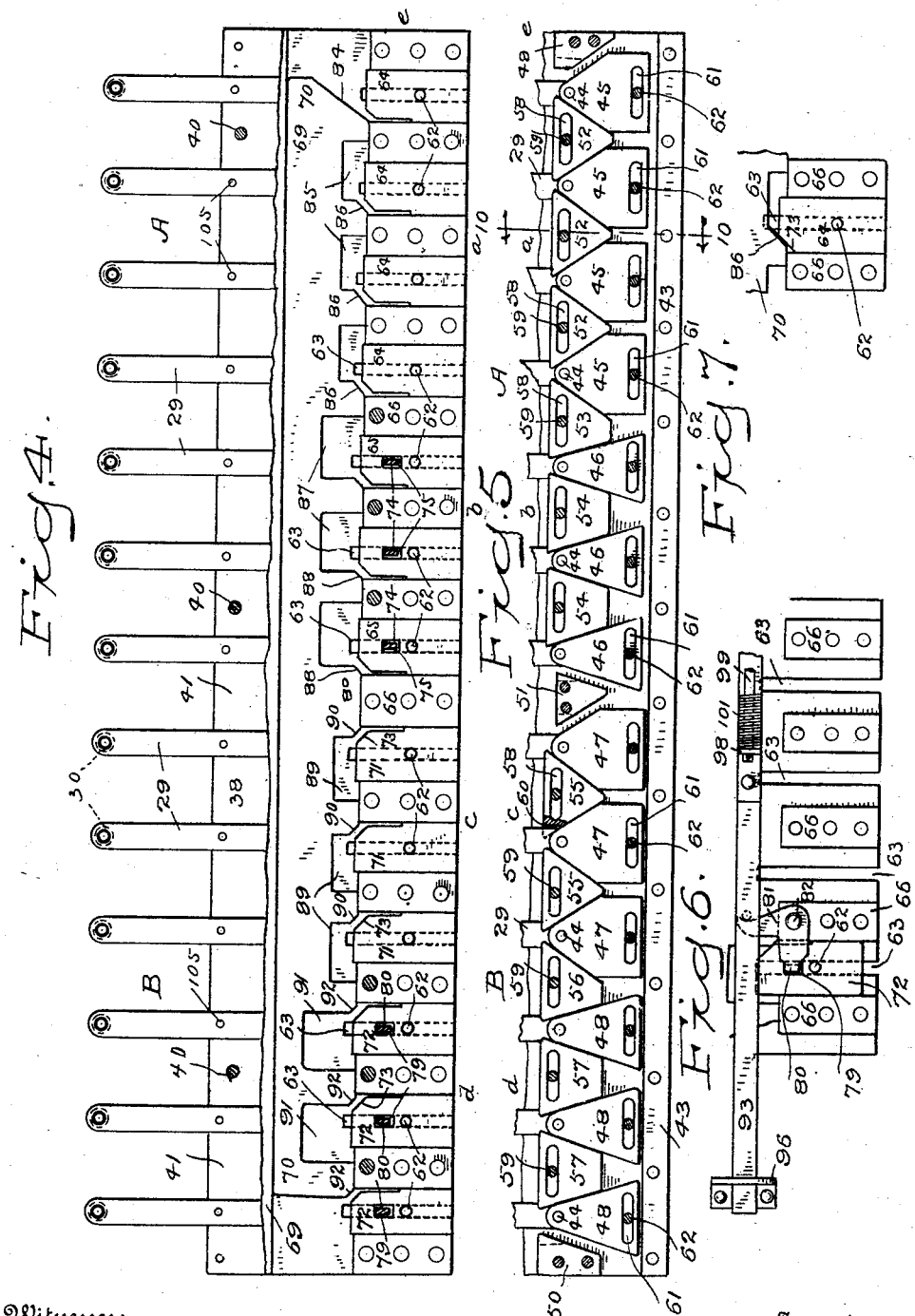
Witnesses:
H. A. Lamb.
S. W. Atherton.
Inventor
Charles C. Abbott
By Attorney
H. W. Wooster C. C. ABBOTT.
CUMULATIVE VOTING MECHANISM.
APPLICATION FILED JULY 8, 1908.
914,009.
Patented Mar. 2, 1909.
4 SHEETS—SHEET 4.
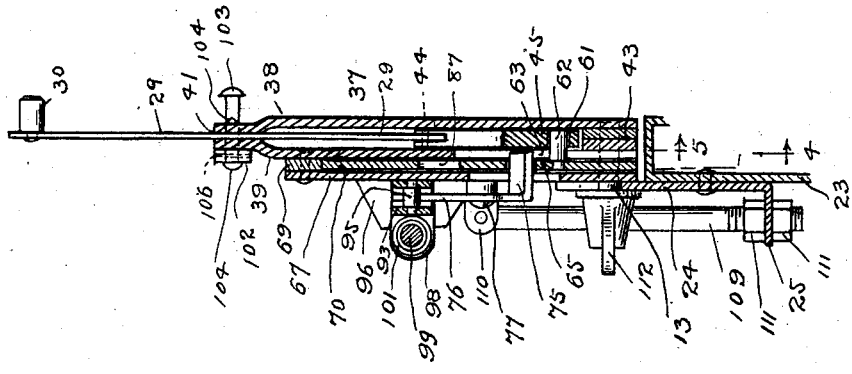
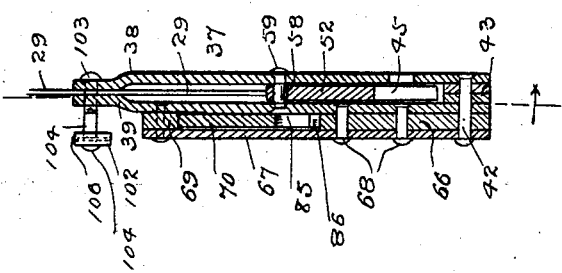
Witnesses:
H. A. Lamb
S. W. Atherton
Inventor
Charles C. Abbott
By Attorney
N. W. Wooster

UNITED STATES PATENT OFFICE.

CHARLES C. ABBOTT, OF PITTSFIELD, MASSACHUSETTS, ASSIGNOR TO TRIUMPH VOTING MACHINE COMPANY, OF PITTSFIELD, MASSACHUSETTS, A CORPORATION OF NEW JERSEY.

CUMULATIVE-VOTING MECHANISM.

No. 914,009.  Specification of Letters Patent.  Patented March 2, 1909.

Application filed July 8, 1908. Serial No. 442,589.

*To all whom it may concern:*

Be it known that I, CHARLES C. ABBOTT, a citizen of the United States, residing at Pittsfield, county of Berkshire, State of Massachusetts, have invented a new and useful Cumulative-Voting Mechanism, of which the following is a specification.

This invention has for its object to provide an attachment for cumulative voting, so called, which may be applied to any voting machine, in which each office line of voting members is controlled by a continuous interlocking member, and which is shown as applied to the Triumph voting machine.

The term "cumulative voting" is used to define the class of voting which provides that a plurality of parties may each nominate a plurality of candidates for any office and it will be obvious that this class of voting is subject to an infinite amount of variation. Suppose, as a simple illustration, that three representatives to a general assembly are to be elected from a district, that there are three parties in the field, and that each party nominates candidates. One purpose of "cumulative voting," so called, is to provide for minority representation, and it is required by the laws of certain States—for example, the State of Illinois—that each voter have the right to cast all of his votes for one candidate or that he divide his votes, fractionally if he chooses, without regard to party, between different candidates, so long as the aggregate of votes or fractional votes cast does not exceed the total number of votes that the voter is entitled to for the office subject to cumulative voting. Continuing the illustration, if there are three officers to be elected each party may nominate one, two or three candidates for this office, and each voter may cast three votes for one candidate, one vote each for three candidates, two votes for one candidate and one vote for another candidate or one and one-half votes for another candidate without regard to party. A voter may, of course, if he chooses, stop with one vote, with one and one-half votes or with two votes, but under no circumstances can he cast an aggregate of more than three votes, nor is the voter permitted to vote in such a way as to rob himself of a final half vote. In other words, while he can cast one and one-half votes for a candidate, he is not permitted after casting one and one-half votes for one candidate to cast one vote for another candidate, making an aggregate of two and one-half votes, thereby depriving himself of the final half vote. In order to protect the voter, therefore, from unintentionally depriving himself of a fractional vote, and protecting all candidates against excess of voting for other candidates beyond the total number of votes permitted, mechanism must be provided that will lock all the voting members belonging to the candidates that may be voted for cumulatively when a party vote has been cast, no matter whether that party may have nominated one, two or three candidates for the office. In other words, having voted a party ticket for this office, the voter has exercised his entire franchise and can cast no additional votes for candidates for this office. Mechanism must also be provided that will enable a voter, when his party has nominated three candidates for an office, to cast three votes for any one of these candidates, and which will lock all other voting members belonging to this office. I also provide mechanism that will enable a voter, when his party has nominated three candidates for an office, to cast two votes for any one of these candidates and which will lock all the other voting members pertaining to these candidates against him with the exception of a single additional vote for any candidate of any party. That is to say, the voter may by a single operation of a voting member vote for all the nominees of his party for this office group whether it may be one, two or three. If three are nominated, one vote is cast for each; if two are nominated, one and one-half votes are cast for each; if one is nominated, three votes are cast for him, or he may, by operating a voting member in the three-vote section, cast three votes for any of the candidates nominated without regard to party, or he may, by operating a voting member in the two-vote section, cast two votes for any of the candidates nominated and then he may, by operating a voting member in the one-vote section, cast one additional vote for any candidate nominated, which may or may not, of course, be the candidate for which he has previously voted in the two-vote section; or he may, by operating a voting member in the one and one-half vote section, cast one and one-half votes for any candidate without regard to party and one and one-half votes for any other candidate without regard to party.

With the above-stated and other objects in view I have devised the novel mechanism which I will now describe, referring to the accompanying drawings forming a part of this specification, and using reference characters to indicate the several parts.

Figure 1 is an elevation of so much of the face of a voting machine as is necessary to illustrate the application thereto of my novel cumulative voting mechanism and displaying a portion of the ballot relating to an office to which the principle of cumulative voting is applied; Fig. 2 an elevation as seen from the rear, showing my novel cumulative voting mechanism in place in a voting machine; Fig. 3 a plan view partly in section corresponding with Fig. 2; Fig. 4 an elevation corresponding with Fig. 2, the cover plate being removed; Fig. 5 a detail sectional view illustrating the construction and operation of the separators and spacing blocks, on the line 5—5 in Fig. 10 looking in the direction of the arrows; Fig. 6 a detail elevation corresponding with Fig. 2, the cover plate and carrying plate being removed; Fig. 7 a detail view illustrating the operation of the locking bar and locking slides; Fig. 8 an end elevation as seen from the right in Fig. 2; Fig. 9 a section on the line 9—9 in Fig. 2 looking in the direction of the arrows; and Fig. 10 is a section on the line 10—10 in Figs. 2 and 5 looking in the direction of the arrows.

20 denotes ballot strips, 21 holders therefor which are secured to the front plate of the machine, 22 the voting levers of voting members and 23 the grouping plate (so called) of a voting machine.

24 denotes a carrying plate for the attachment which is rigidly secured to the grouping plate and is provided at its lower end with a flange 25.

26 denotes one of the interlocking members. The interlocking members of the machine correspond in number with the office columns of voting members, the operation of a voting member acting to contract the corresponding interlocking member longitudinally, taking up the slack therein and making it rigid. So far as the present invention is concerned, any form of continuous interlocking members and any form of voting members may be used, as, push buttons in lieu of oscillatory voting members. The lower end of each interlocking member is connected to a vertically movable carrier 27 which is retained in contact with a housing 28. The specific construction of the carrier and the housing is not illustrated in detail for the reason that it forms no portion of the present invention.

29 denotes a series of links, thirteen in number in the present instance, which carry at their upper ends studs 30, which pass through slots 31 in the housing and engage holes 32 in the carriers, each carrier being provided with a hole to receive one of the studs. This cumulative voting attachment may be applied to any portion of the face of the machine. I have shown it as applied to the 13th, to the 25th office columns of voting members and for convenience in illustration have shown three party lines only, it being understood, of course, that the number of party lines in the attachment may correspond with the number of party lines in the machine. Studs 30 are retained in engagement with the carriers by means of a retaining bar 33, which is adapted to slide freely in slots 34, in brackets 35, secured to the housing, the brackets being placed closely enough together to provide ample support for the bar in any position in which it may be placed. The bar is locked in position to retain the attachment in place by means of latches 36 pivoted to the brackets and engaging locking slots in the retaining bar.

The operative parts of the attachment are carried by a casing 37 comprising side plates 38 and 39. The upper edges of the side plates are curved toward each other and are secured by spacing rivets 40, leaving a slot 41 through which links 29 pass freely. The lower ends of the side plates are secured together by rivets 42 which pass through spacing plates 43 and also through other parts presently to be described.

Turning now to Figs. 4 and 5 (which see in connection with Fig. 1), I will describe the operative parts of the attachment. It must be borne in mind that Fig. 1 is a front view and Figs. 4 and 5 are rear views. The thirteen office columns comprised in the attachment are divided into two groups, which I will designate as group A and group B. Group A includes the party column, which for convenience I will term section $e$, which is column 13 in Fig. 1, the three-vote section which is specifically indicated by $a$ and includes the 14th, 15th and 16th office columns; and the one and one-half vote section which is specifically indicated by $b$ and includes the 17th, 18th and 19th office columns. Group B comprises the two-vote section which is specifically indicated by $c$ and includes the 20th, 21st and 22nd office columns, and the one-vote section specifically indicated by $d$ which includes the 23rd, 24th and 25th office columns. At the lower end of each link 29 is pivoted an angular separator as at 44. The separators all lie within casing 37. The four separators belonging to sections $a$ and $e$ are indicated by 45, the three separators belonging to section $b$ by 46, the three separators belonging to section $c$ by 47, and the three separators belonging to section $d$ by 48. At the right end of the casing, as seen in Figs. 5, is a fixed end block 49 having an angular face corresponding with the contiguous face of the right separator 45. At the left end of the casing, as seen in Fig. 5, is a fixed end block 50 having an angular face corresponding with the contiguous face of the left separator 48.

Intermediate groups A and B is a fixed center block 51 having dissimilar angular faces, one of which corresponds with the contiguous face of the left separator 46, the other corresponding with the contiguous face of the right separator 47. Intermediate separators 45 are angular laterally movable spacing blocks 52 having faces corresponding with the contiguous faces of said separators. Intermediate the left separator 45 and the right separator 46 is an angular laterally movable spacing block 53 having dissimilar faces corresponding respectively with the contiguous faces of said left separator 45 and said right separator 46. Intermediate separators 46 are angular laterally movable spacing blocks 54 having faces corresponding with the faces of the contiguous separators. Intermediate separators 47 are angular laterally movable spacing blocks 55 having faces corresponding with the faces of the contiguous separators. Intermediate the left separator 47 and the right separator 48 is an angular laterally movable spacing block 56 having dissimilar faces corresponding with the contiguous faces of said left separator 47 and said right separator 48. Intermediate separators 48 are angular laterally movable spacing blocks 57 having faces corresponding with the contiguous faces of said separators. Each of the movable spacing blocks is provided with a horizontal slot 58 through which a rivet 59 passes, the ends of said rivet being shown as headed in the casing. These rivets retain the spacing blocks against vertical movement, but leave them free to move laterally. The edges of the movable spacing blocks are provided with clearance slots 60 which receive links 29 freely. Each separator is provided at its lower end with a horizontal slot 61 which receives a stud 62. These studs pass through slots 63 in side plate 39 of the casing and the outer ends thereof are riveted in vertically movable locking slides. Studs 62 leave the separators free to move laterally independently of the locking slides, but transmit the vertical movement of the separators to the locking slides. The locking slides belonging to section $a$ are indicated by 64, the locking slides belonging to section $b$ by 65, the locking slides belonging to section $c$ by 71, and the locking slides belonging to section $d$ are indicated by 72. Intermediate the locking slides are guide blocks 66 and outside of the guide blocks and covering the locking slides is a cover plate 67 which is secured to the casing by rivets 42 and 68 which pass through the guide blocks. Between the upper end of the cover plate and side plate 39 of the casing is a spacing bar 69, against the under side of which a locking bar 70 bears in operation. The locking slides are all provided with angular bearing faces 73. T bearing faces of the locking slides in sectio s $a$ and $b$, indicated respectively by 64 and 6 face inward toward the center; that is, toward the left as seen in Fig. 4. The bearing faces of the locking slides in sections $c$ and $d$, which are respectively indicated by 71 and 72, also face inward toward the center, that is, toward the right as seen in Fig. 4. The locking slides in section $b$, indicated by 65, are provided with slots 74 which are engaged by lugs or projections 75 extending from the lower arms of bell crank lever 76 pivoted to cover plate 67 as at 77, said lugs or projections extending through slots 78 in the cover plate, through the slots in the locking slides and are shown as extending into slots 63 in side plate 39 of the casing (see Figs. 2 and 9 in connection with Fig. 4). The locking slides in section $d$, indicated by 72, are provided with slots 79 which are engaged by lugs or projections 80 extending from the lower arms of bell crank levers 81 pivoted to cover plate 67 as at 82, said lugs or projections extending through slots 83 in the cover plate, through the slots in the locking slides and are shown as extending into slots 63 in side plate 39 of the casing.

Locking bar 70 rests upon the upper ends of guide blocks 66 and is provided with the following features of construction from the right toward the left: with an incline 84 which is adapted to be engaged by the bearing face of the right locking slide 64; with recesses 85 which are adapted to receive the upper ends of the second, third and fourth locking slides 64; with inclines 86 which are adapted to be engaged by the bearing faces of the second, third and fourth locking slides 64; with recesses 87 which are adapted to receive the upper ends of locking slides 65; with inclines 88 which are adapted to be engaged by the bearing faces of locking slides 65; with recesses 89 which are adapted to receive the upper ends of locking slides 71; with inclines 90 which are adapted to be engaged by the bearing faces of locking slides 71; with recesses 91 which are adapted to receive the upper ends of the first and second locking slides 72 counting from right to left, and with inclines 92 which are adapted to be engaged by the bearing faces of locking slides 72.

93 denotes a double returning bar, the side plates 94 of which are held in place by spacing rivets 95 (see Figs. 3 and 9). This bar slides over the face of cover plate 67 and is held in place by brackets 96 and 97 through which the ends of the bar slide freely. 98 denotes a bracket at the mid-length of the returning bar and 99 a rod the ends of which pass through brackets 98 and 97 and are retained in place by pins 100 which pass through the ends of the rod outside the brackets. 101 denotes a coil spring supported by the rod and the ends of which bear against the brackets 98 and 97, the action of the spring being to move the bar toward the left as shown in Fig. 2. The function of the returning bar is to return bell crank levers 76 and 81, and with them, of course, locking slides 65 and 72, to their normal position after a voting operation, as will be more fully explained. The upper arms of the bell crank levers extend upward between the side plates of the returning bar and engage spacing rivets 95. When a locking slide 65 or 72 is raised by a voting operation, as will be more fully explained, the corresponding bell crank lever will bear against a spacing rivet and will force the returning bar toward the right against the power of the spring. When the exit mechanism of the machine is operated or when a voter changes his mind and unvotes a vote that he has cast, the spring will act to force the returning bar toward the left and the spacing rivets will engage the upper arms of operated bell crank levers and return them to their normal position and the levers will return operated locking slides 65 and 72 to their normal position.

It should be noted that the returning bar and the bell crank levers are not essential features of construction. They are shown as applied to locking slides 65 and 72 which may have the highest rise in use in order to avoid the possibility of said locking slides not dropping to their normal position by gravity after a voting operation. As locking slides 64 and 71 do not rise past the corresponding inclines on the locking bar, they are certain to drop to their place by gravity and even if they should not drop by gravity they would be forced downward by the engagement of the inclines on the returning bar with the bearing faces on the slides at the next movement of the bar.

The locking bar is not connected to other parts of the machine, but is simply a loose bar and remains in the position to which it is moved by a voting operation until it is moved in the opposite direction by a voting operation in the other group. If there should be continuous voting in group A, the locking bar would not be moved at all. It is moved toward the right by a voting operation in group B, the effect of which is to lock all the locking slides in group A by engagement of the inclines on the bar with the bearing faces of the slides in said group, as clearly shown in Fig. 7. Additional voting in group B will have no effect on the locking bar, which will remain in the position in which it was left until a vote is cast in group A, the effect of which will be to move the locking bar toward the left and to lock every locking slide in group B in the manner just described. In other words, a voter having cast a ballot in one group must complete his voting operation in that group. He cannot, having cast a ballot in one group, complete his franchise by casting an additional ballot in the other group, but before casting any ballot in the other group he must unvote all votes cast in the first group. As already stated, this attachment is wholly independent of the voting machine proper and can be readily shifted from one portion of the machine to another. In order to hold links 29 in position for attachment and also to position them vertically so as to place the separators and locking slides in proper adjustment to give the required amount of slack, I provide a positioning bar 102 which is connected to the upper end of casing 37 by means of long sliding studs 103 which pass freely through the casing, are headed on their inner ends and are rigidly secured to the bar by pins 106.

104 denotes a series of studs carried by bar 102 which are adapted to pass through both side plates of the casing and through holes 105 in the links. These studs act to retain the links in the vertical position and also to position the separators and locking slides vertically. Suppose the attachment to be on the machine and in use, the positioning bar and studs would be in the position shown in Fig. 10. Before removing the attachment, however, the positioning bar and studs are moved inward, as in Fig. 9, and are locked in this position by means of sliding latches 107 which lie between the upper ends of plates 38 and 39 of the casing in horizontal alinement with the links, as clearly shown in Fig. 3 (which see in connection with Figs. 2 and 8). The latches are provided with slots having enlargements at their lower ends and long studs 103 are provided with notches 108. When the latches are raised, the studs are placed in alinement with the enlargements at the lower ends of the slots. The positioning bar and studs may then be moved in or out as in Figs. 9 and 10. The bar and studs are then locked in either position by engagement of the walls of the slots in the latches with notches 108 in studs 103, one of said notches appearing in Fig. 3, the other notch being engaged by the latch. The engagement of the walls of the slots with the notches also acts to hold the latches against rotation.

109 denotes a swinging bolt the upper end of which is pivoted to ears 110 extending outward from the cover plate. The threaded end of this bolt passes through flange 25 of the carrying plate, slots 115 being provided to receive the bolts. In setting up the machine, the casing is pulled downward until the interlocking members and carriers are taut and the parts are then locked in place by nuts 111 which engage the opposite sides of flange 25 (see Figs. 8 and 9). The attachment is then locked against lateral movement by means of thumb nuts 112 engaging studs 113 which extend rigidly from the casing and pass through slots 114 in carrying plate 24. Having secured the attachment in place, latches 107 are raised and positioning bar 102 is drawn out as in Fig. 10 and then locked in the drawn out position by the latches. This leaves the attachment securely in place on the machine, and the parts of the attachment unlocked ready for use. Before removing the attachment, the parts thereof are again locked in position, as already described, by moving the positioning bar inward, as in Fig. 9, studs 104 engaging the links, as already described. Should it be required to shift the attachment to another portion of the machine, thumb nuts 112 are removed, the nuts 111 loosened, latch 36 lifted and the retaining bar 33 moved longitudinally from before the links, the retaining bar, however, being still held by brackets 35 which are placed closely enough together to support the retaining bar at any portion of the machine. Studs 30 may now be withdrawn from the carriers and the attachment lifted from the machine. After placing the attachment in its new position, it is locked in place, as already described, and then the parts of the attachment are unlocked ready for use by withdrawing the positioning bar, as in Fig. 10, which permits the links and separators to swing freely.

The operation is as follows: If the machine to which the attachment is applied is provided with grouping mechanism, the locking devices of the grouping mechanism are withdrawn from the portion corresponding with the office columns to which the attachment is applied, leaving that portion of the grouping mechanism unlocked, that is, wholly free. As has already been clearly explained, each separator and the corresponding locking slide are attached by means of a link and carrier to an interlocking member (see 26 in Fig. 8). In the present instance, it is assumed that the machine to which the attachment is applied is provided with party levers and party bars. In this arrangement the individual voting members of the right office column, as seen in Fig. 5, are connected to the party bars which are not shown, as specifically they form no portion of the present invention. The voting members of the other twelve office columns to which the attachment is applied are not connected to the party bars. When a voter operates his party lever, he votes for the regular nominees of his party (which, in the present instance, may be one, two or three) in one of the office columns to which the attachment is applied, as well as the other nominees of his party. Should a voter desire to split or to change his vote in any way, he must unvote the individual voting member corresponding with the candidate he desires to scratch and may then vote in any of the other sections of the attachment as he sees fit, but he cannot cast a total vote for the office to which the attachment is applied exceeding three. The portion of the ballot corresponding with the attachment is arranged as shown in Fig. 1. Should a party nominate three candidates for the office, the names are placed under one individual voting member in the party line, as in section $e$ at the left in Fig. 1. By operating this member he would cast the party vote for the office, would lock all the other voting members and would exhaust his franchise for this office. Should a party nominate two candidates for the office, the two names are placed under an individual voting member in the same section and in the proper party line. By operating this voting member the voter would cast one and one-half votes for each of the candidates, would lock all the other voting members and would exhaust his franchise for this office. Should a party nominate but one candidate for the office the name of that candidate is placed under a voting member in the same section and in the proper party line. The operation of this voting member would cast three votes for the candidate, would lock all the other voting members and would exhaust his franchise for this office, all as clearly shown at the left in Fig. 1.

Adjacent to section $e$ toward the right is section $a$, which I term the three-vote section. If a party nominates three candidates, the three names appear in this section, in the proper party line, under voting members. If the party nominates two candidates the names of these candidates are placed under voting members in the same section, and in the proper party line. If the party nominates but one candidate, the name of that candidate is placed under a voting member in the same section and in the proper party line. The operation of any voting member in this section results in casting three votes for the candidate without regard to party and locks all the other voting members for the office to which the attachment is applied. Adjacent to section $a$ toward the right is section $b$, which I term the one and one-half vote section. If a party nominates three candidates the three names appear in this section in the proper party line under individual voting members, as before. If a party nominates two candidates, the names of these candidates are placed as before, and if the party nominates but one candidate, the name of that candidate is placed as before. The operation of any voting member in this section results in casting one and one-half votes for the candidate voted for, locks the voting members in all the other sections, but leaves the voter free to cast one and one-half votes for any other candidate.

For convenience in description, I have included sections $e$, $a$ and $b$ in one group, which I have termed group A, this for the reason that when a voter has cast a vote or a partial vote in either section of group A, he cannot vote in any other section of the group or in group B, which comprises sections c and d. Section c, which I term the two-vote section, is adjacent to section b toward the right. If a party nominates three candidates, the three names appear in this section in the proper line under individual voting members, as before. If a party nominates two candidates, the names of these candidates are placed as before, and if the party nominates but one candidate the name of that candidate is placed as before. The operation of any voting member in this section results in casting two votes for the candidate voted for, locks all the voting members in group A and the other voting members in section c, leaving the voting members in section d unlocked, so that a voter having voted in section c can still cast one additional vote in section d, thus completing his franchise of three votes. Adjacent to section c toward the right is section d, which I term the one-vote section. If a party nominates three candidates or two candidates or one candidate, the names of these candidates are placed in section d under individual voting members as before. The operation of any voting member in this section results in casting one vote for the candidate voted for, leaving the voter free to cast one vote each for two other candidates in the same section; or, if he has not voted previously, to cast two votes for any candidate in the two-vote section, but locking all the voting members in group A, so that under no circumstances can he cast more than an aggregate of three votes.

Turning now to Fig. 5, it will be understood that the angles of the contiguous operative faces of the separators, the spacing blocks, the center block and the end blocks is such that the operation of a voting member on an interlocking member raises the corresponding separator just high enough to produce the results I have just described, that is, sufficient slack is provided in the attachment to permit a voter to cast an aggregate of three votes, divided up in any of the ways I have described, but effectually locking the mechanism against the casting of more than three votes for the office to which the attachment is applied. It will be understood, of course, that the three votes described in this specification is merely an arbitrary number selected for illustration, and that the principle I have described in detail can be variously applied within the limits of the mechanism. The attachment once adjusted in assembling remains as adjusted, and the placing of the attachment on the machine is made perfectly simple, as the parts of the attachment are locked in place by the positioning bar when not in use. When the attachment is placed in position on a voting machine, the interlocking members, carriers, links and separators all hang loose, and the casing is drawn down and locked to flange 25 of the carrying plate by means of nuts 111 on the swinging bolts, studs 30 on the links having previously been placed in engagement with the carriers. When the interlocking members, carriers, links and separators are all drawn down taut and are locked in place by the adjustment of nuts 111 on the swinging bolts on opposite sides of flange 25, the exact amount of slack required for the operation of the attachment will be provided for by the spaces left between the spacing blocks, end blocks and center blocks and the contiguous separators. Operation of the party lever (not shown) or of an individual voting member in section e (at the left in Fig. 1), acts to raise the right separator 45, as seen in Fig. 5. The operative faces of separators 45 and 46, spacing blocks 52, 53 and 54, right end block 49 and the right side of center block 51 are such that the raising of the right separator 45 by the operation of the party lever (not shown) or an individual voting member in section e will place said separator in engagement with end block 49 and will force the other separators 45, the separators 46 and the spacing blocks 52, 53 and 54 toward the left, and will place the left separator 46 closely in engagement with center block 51.

The locking of the entire mechanism in group B by a voting operation in group A and vice versa is effected by means of the vertically movable locking slides and the longitudinally movable locking bar. It will be remembered that each separator has connected to it a locking slide. These slides have no lateral movement, but are moved vertically by the separators, the connection being such as to leave the separators free to move laterally. Vertical movement of any locking slide in group A acts to force the locking bar toward the left, as seen in Fig. 4, and into engagement with the locking slides in group B, locking all of these slides, and consequently locking the entire group against a voting operation therein. Vertical movement of any locking slide in group B acts to force the locking bar toward the right, as seen in Fig. 4, and into engagement with the locking slides in group A, locking said group entire in the same manner.

The operation of a voting member in section a, the three-vote section, has practically the same effect as the operation of the party lever (not shown), or the operation of a voting member in section e, that is to say, the raising of the second, third or fourth separators 45, counting from the right in Fig. 5, takes up the entire slack in the section. This is owing to the special angles of the operative faces of separators 45, end block 49, spacing blocks 52 and the right side of spacing block 53. In section $b$, the one and one-half vote section, the operative faces of separators 46, spacing blocks 54 and the left side of spacing block 53 and the right side of center block 51 are such as to provide for two voting operations in the section, that is to say, sufficient slack is provided in group A to permit the raising of two separators in section $b$, or either separator in said section may be raised twice by the operation of two voting members in the same office column, but in different party lines. In section $c$, the two vote section, the operative faces of separators 47, the left side of center block 51, spacing blocks 55 and the right side of spacing block 56 are such as to provide that the operation of one voting member and the raising of one separator in said section will take up two-thirds of the slack in the section, thus locking the mechanism against another vote in this section, but permitting an additional vote to be cast in the one-vote section, which is in the same group. In section $d$, the one-vote section, the operative faces of separators 48, the left side of spacing block 56, spacing blocks 57 and end block 50, are such as to provide for three voting operations in the section, that is to say, sufficient slack is provided in group B to permit the raising of three separators in section $d$ or to permit either separator to be raised three times by the operation of three voting members in the same office column but in different party lines; or to permit one separator to be raised twice and another separator in the section to be raised once by voting operations, or, if preferred, as already explained, one vote may be cast in the one-vote section, and two votes may be cast by operating a voting member in the two-vote section for the same or another candidate. The one vote and the one and one-half vote sections, in either of which a separator and the corresponding locking plate may be raised more than once, that is, a double or triple distance, are provided with bell crank levers and a spring-controlled returning bar to insure the return of the locking slides and separators should more than one vote be cast in any office column. As already explained, the first vote cast in either group A or group B, locks the other group against any voting operation therein, the locking bar remaining wherever it is placed by a voting operation until it is moved in the opposite direction by a voting operation in the other group.

Having thus described my invention, I claim:—

1. An attachment for cumulative voting comprising a plurality of vertically and laterally movable separators adapted for attachment to the interlocking members of a voting machine, vertically movable locking slides and laterally movable spacing blocks intermediate the separators.

2. An attachment for cumulative voting comprising a plurality of vertically and laterally movable separators, vertically movable locking slides connected to the vertically and laterally movable separators, a locking bar adapted to be engaged and moved by an operated locking slide and to lock other locking slides and laterally movable spacing blocks intermediate the separators.

3. An attachment for cumulative voting comprising groups of vertically and laterally movable separators, vertically movable locking slides connected to the vertically and laterally movable separators and a locking bar, said locking slides and locking bar having corresponding operative faces, movement of a locking slide in either group moving the locking bar into engagement with the locking slides of the other group and locking the mechanism of the other group against operation.

4. An attachment for cumulative voting comprising a plurality of vertically and laterally movable separators, laterally movable spacing blocks intermediate the separators, a fixed center block and fixed end blocks adapted to be engaged by the contiguous separators.

5. An attachment for cumulative voting comprising a plurality of sections of vertically and laterally movable separators, the separators in said sections having variant operative faces, and laterally movable spacing blocks intermediate the separators and having variant operative faces corresponding with the faces of the contiguous separators.

6. An attachment for cumulative voting comprising a plurality of vertically and laterally movable separators, a fixed center block which divides the separators into groups, laterally movable spacing blocks intermediate the separators in each group, said separators having variant operative faces and the spacing blocks having operative faces corresponding with the faces of the contiguous separators, vertically movable locking slides connected to the separators and a locking bar, said locking slides and locking bar having corresponding operative faces, movement of a locking slide in either group causing the locking bar to engage and lock the slides of the other group.

7. An attachment for cumulative voting consisting of a plurality of vertically and laterally movable separators comprising sections, the separators in each section having similar operative faces which are unlike the operative faces of the separators in the other sections, laterally movable spacing blocks intermediate the separators in the several sections and having operative faces corresponding with the faces of the contiguous separators, vertically movable locking slides connected to the separators and a locking bar adapted to be moved by an operated locking slide and to lock other locking slides.

8. An attachment for cumulative voting comprising a plurality of vertically and laterally movable separators, vertically movable locking slides connected to the separators, the locking slides at one end of the attachment having operative faces upon one side and the locking slides at the other end of the attachment having operative faces on the other side and a locking bar having inclines corresponding with the faces of the contiguous locking slides, movement of the locking bar by a locking slide acting to lock all the slides having operative faces on the sides toward which the bar is moved.

9. An attachment for cumulative voting comprising a plurality of vertically and laterally movable separators, links to whose lower ends the separators are pivoted and whose upper ends are adapted to be pivoted to vertically movable carriers, laterally movable spacing blocks intermediate the separators and vertically movable locking slides.

10. An attachment for cumulative voting comprising a plurality of vertically and laterally movable separators, links to whose lower ends the separators are pivoted and whose upper ends are adapted to be pivoted to vertically movable carriers, laterally movable spacing blocks intermediate the separators, vertically movable locking slides connected to the separators, said locking slides comprising two groups and both groups having operative faces facing inward and a locking bar having inclines corresponding with the operative faces of the slides, movement of the bar by a locking slide acting to lock all the slides in the other group.

11. An attachment for cumulative voting comprising a plurality of vertically and laterally movable separators, links to whose lower ends the separators are pivoted and whose upper ends are adapted to be pivoted to vertically movable carriers, laterally movable spacing blocks intermediate the separators, a center block and end blocks, said separators comprising sections having variant operative faces and the blocks having operative faces corresponding with the faces of the contiguous separators.

12. An attachment for cumulative voting comprising a plurality of vertically and laterally movable separators adapted for connection to the interlocking members of a voting machine, laterally movable spacing blocks intermediate the separators, a center block dividing the separators and spacing blocks into groups and end blocks.

13. An attachment for cumulative voting comprising a plurality of vertically and laterally movable separators, means for connecting said separators to the interlocking members of a voting machine, laterally movable spacing blocks intermediate the separators, a center block dividing the separators and spacing blocks into groups, end blocks, vertically movable locking slides connected to the separators, the slides in each group having operative faces facing in opposite directions and a locking bar having inclines adapted to be engaged by the operative faces of the slides, movement of a slide in one group causing the bar to lock the slides in the other group and prevent movement of the separators in said group.

14. An attachment for cumulative voting comprising a plurality of vertically and laterally movable separators, means for connecting said separators to the interlocking members of a voting machine, laterally movable spacing blocks intermediate the separators, vertically movable locking slides connected to the separators, said separators and spacing blocks comprising sections, the separators in said sections having variant operative faces and the spacing blocks having operative faces corresponding with the separators.

15. An attachment for cumulative voting comprising a plurality of vertically and laterally movable separators, laterally movable spacing blocks intermediate the separators, vertically movable locking slides connected to the separators and having operative faces facing in opposite directions, said separators, spacing blocks and locking slides comprising sections, the separators in said sections having variant operative faces and the spacing blocks having variant faces corresponding with the separators and a locking bar having inclines corresponding with the operative faces of the locking slides and recesses to receive the locking slides when raised, the raising of a slide acting to move the bar and to lock other slides.

16. An attachment for cumulative voting comprising a plurality of vertically and laterally movable separators, laterally movable spacing blocks intermediate the separators, said separators comprising sections, the separators in said sections having variant operative faces and the spacing blocks having operative faces corresponding with the contiguous separators, vertically movable locking slides having operative faces and a locking bar having corresponding inclines and recesses to receive the locking slides when raised.

17. An attachment for cumulative voting comprising a plurality of vertically and laterally movable separators, laterally movable spacing blocks intermediate the separators, end blocks and a center block, said separators comprising sections, the separators in said sections having variant operative faces and the blocks having operative faces corresponding with the contiguous separators, spaces being provided between the blocks and the separators, and the operative faces of the separators and blocks coacting to permit the separators in each section to be raised a predetermined distance.

18. An attachment for cumulative voting comprising a plurality of vertically and laterally movable separators, laterally movable spacing blocks intermediate the separators, end blocks and a center block, said separators comprising sections, the separators in said sections having variant operative faces and the blocks having operative faces corresponding with the contiguous separators, spaces being provided between the blocks and the separators, and the operative faces of the separators and blocks coacting to permit the separators in each section to be raised a predetermined distance, vertically movable locking slides connected to the separators and having operative faces and a locking bar having inclines coacting with the operative faces of the slides to move the bar for the purpose set forth and recesses to receive the locking slides when raised.

19. An attachment for cumulative voting comprising a plurality of vertically and laterally movable separators, laterally movable spacing blocks intermediate the separators, said separators comprising sections, the separators in said sections having variant operative faces and the blocks having corresponding operative faces, vertically movable locking slides connected to the separators and a horizontally movable locking bar engaging with the locking slides.

20. An attachment for cumulative voting comprising a plurality of vertically and laterally movable separators, laterally movable spacing blocks intermediate the separators, end blocks and a center block, said separators comprising sections, the separators in said sections having variant operative faces and the blocks having operative faces corresponding with the contiguous separators, spaces being provided between the blocks and the separators, and the operative faces of the separators and blocks coacting to permit the separators in each section to be raised a predetermined distance, bell crank levers having arms engaging the locking slides having the highest rise and a spring-controlled returning bar engaging the other arms of said levers to return actuated locking slides.

21. An attachment for cumulative voting comprising a plurality of vertically and laterally movable separators, laterally movable spacing blocks intermediate the separators, and end blocks, said separators having variant operative faces and the blocks having corresponding operative faces, spaces being provided between the blocks and the separators to permit one or more separators to be raised a predetermined distance, vertically movable locking slides connected to the separators and means for returning raised slides after a voting operation.

22. An attachment for cumulative voting comprising a plurality of vertically and laterally movable separators, laterally movable spacing blocks intermediate the separators, and end blocks, said separators having variant operative faces and the blocks having corresponding operative faces, spaces being provided between the blocks and the separators to permit one or more separators to be raised a predetermined distance, levers engaging certain of the slides and a spring-controlled returning bar engaging the levers to return actuated slides after a voting operation.

23. An attachment for cumulative voting comprising a plurality of vertically and laterally movable separators, laterally movable spacing blocks intermediate the separators, vertically movable locking slides connected to the separators, levers engaging certain of the slides, a double returning bar having spacing rivets which engage the levers and a spring acting on the spacing bar to return said bar, operated levers, locking slides and separators to their normal position after a voting operation.

24. An attachment for cumulative voting comprising a plurality of vertically and laterally movable separators, laterally movable spacing blocks intermediate the separators, and end blocks, said separators having variant operative faces and the blocks having corresponding operative faces, spaces being provided between the blocks and the separators to permit one or more separators to be raised a predetermined distance, vertically movable locking slides having slots, levers having lugs engaging the slots and a spring-controlled returning bar engaging the levers for the purpose set forth.

25. An attachment for cumulative voting comprising vertically and laterally movable separators, laterally movable spacing blocks intermediate the separators, a casing inclosing said separators and spacing blocks and having a slot at its upper end, links pivoted to the separators and extending through said slot and means for locking said links to the casing when the attachment is not in use.

26. An attachment for cumulative voting comprising vertically and laterally movable separators, laterally movable spacing blocks intermediate the separators, a casing inclosing said separators and spacing blocks and having a slot at its upper end, links pivoted to the separators and extending through said slot, a positioning bar, long sliding studs connected to the bar and passing through the casing and studs carried by said bar and adapted to engage the casing and the links to lock the latter against movement when connecting the attachment to a voting machine or removing it.

27. An attachment for cumulative voting comprising vertically and laterally movable separators, laterally movable spacing blocks intermediate the separators, a casing inclosing said separators and spacing blocks and having a slot at its upper end, links pivoted to the separators and extending through said slot and having studs adapted to engage a movable part of a voting machine and means for locking said studs in the engaging position.

28. An attachment for cumulative voting comprising vertically and laterally movable separators, laterally movable spacing blocks intermediate the separators, a casing inclosing said separators and spacing blocks and having a slot at its upper end, links pivoted to the separators and extending through said slot and having studs adapted to engage a movable part of a voting machine, a sliding retaining bar adapted to retain the studs in the engaging position and means for locking said bar and retaining the studs in the engaging position.

29. An attachment for cumulative voting comprising vertically and laterally movable separators, laterally movable spacing blocks intermediate the separators, links pivoted to the separators, a casing inclosing said separators and spacing blocks and means for adjusting said casing to determine the vertical adjustment of the spacing blocks.

30. An attachment for cumulative voting comprising vertically and laterally movable separators, laterally movable spacing blocks intermediate the separators, links pivoted to the separators, a casing inclosing said separators and spacing blocks, vertically movable locking slides lying outside the casing and connected to the separators, a cover plate secured to the casing and inclosing the locking slides, swinging bolts pivoted to the cover plate and adapted to engage a slotted portion of a voting machine and nuts on said bolts for determining the vertical adjustment of the casing and separators.

31. An attachment for cumulative voting comprising vertically and laterally movable separators, laterally movable spacing blocks intermediate the separators, links pivoted to the separators, a casing inclosing said separators and spacing blocks, vertically movable locking slides lying outside the casing and connected to the separators, a longitudinally movable locking bar coacting with the locking slides, a cover plate secured to the casing and inclosing the locking slides and locking bar and a spacing bar between the cover plate and casing against which the locking bar bears in use.

32. An attachment for cumulative voting comprising a plurality of vertically and laterally movable separators, laterally movable spacing blocks intermediate the separators, said separators comprising sections having variant operative faces and the faces of the spacing blocks corresponding with the contiguous faces of the separators and allowing a predetermined rise of the separators in the several sections, and voting members corresponding with the separators to permit the voter to cast one, one and one-half or a plurality of votes by operation of a single voting member.

33. An attachment for cumulative voting comprising a plurality of vertically and laterally movable separators, laterally movable spacing blocks intermediate the separators, said separators having variant operative faces and the faces of the spacing blocks corresponding therewith, a center block dividing the separators and spacing blocks into groups, locking slides connected to the separators, a locking bar coacting with the locking slides for the purpose set forth and voting members corresponding with the separators, a vote in one group causing the operated locking slide to actuate the locking bar and lock the slides in the other group.

34. An attachment for cumulative voting comprising a plurality of vertically and laterally movable separators, laterally movable spacing blocks intermediate the separators, said separators comprising sections having variant operative faces and the faces of the spacing blocks corresponding with the faces of the contiguous separators, a center block dividing the sections into two groups, vertically movable locking slides connected to the separators and a locking bar coacting with the locking slides, the operative faces of the separators and blocks allowing a predetermined rise of the locking slides in the several sections and the raising of a slide actuating the locking bar and locking the slides in the other group.

35. An attachment for cumulative voting comprising vertically and laterally movable separators, laterally movable spacing blocks intermediate the separators, vertically movable locking slides connected to the separators and a laterally movable locking bar coacting with the locking slides.

36. An attachment for cumulative voting comprising vertically and laterally movable separators, and laterally movable spacing blocks intermediate the separators, said separators comprising sections having variant operative faces and the spacing blocks corresponding therewith, the separators and blocks being spaced to permit a predetermined rise of the separators in each section.

37. An attachment for cumulative voting comprising vertically and laterally movable separators, laterally movable spacing blocks intermediate the separators, said separators having variant operative faces and the spacing blocks corresponding therewith, vertically movable locking slides connected to the separators and means for returning the slides after a voting operation.

38. An attachment for cumulative voting comprising vertically and laterally movable separators, links adapted to connect said separators to the interlocking members of a voting machine, laterally movable spacing blocks intermediate the separators and vertically movable slides for locking the links and the separators in operative position.

39. An attachment for cumulative voting comprising vertically and laterally movable separators, laterally movable spacing blocks intermediate the separators, a center block dividing the separators into groups, and end blocks, said separators having variant operative faces and the contiguous faces of the blocks corresponding with the separators, vertically movable locking slides connected to the separators and means coacting with the locking slides to lock the slides in one group when a slide in the other group is operated.

40. An attachment for cumulative voting comprising vertically and laterally movable separators adapted for attachment to the interlocking members of a voting machine, laterally movable spacing blocks intermediate the separators and locking slides for retaining the spacing blocks against vertical movement.

41. An attachment for cumulative voting comprising vertically and laterally movable separators, vertically movable locking slides connected to the separators and laterally movable spacing blocks intermediate the separators.

42. An attachment for cumulative voting comprising vertically and laterally movable separators, laterally movable spacing blocks intermediate the separators, vertically movable locking slides connected to the separators and a locking bar adapted to be operated by the locking slides.

43. An attachment for cumulative voting comprising vertically and laterally movable separators, laterally movable spacing blocks intermediate the separators, vertically movable locking slides connected to the separators and a locking bar coacting with the locking slides.

44. An attachment for cumulative voting comprising vertically and laterally movable separators, laterally movable spacing blocks intermediate the separators, vertically movable locking slides connected to the separators, bell crank levers connected to the locking slides and a spring-controlled returning bar engaging said levers.

45. An attachment for cumulative voting comprising vertically and laterally movable separators, laterally movable spacing blocks intermediate the separators, means for connecting said separators to the interlocking members of a voting machine and means for locking said separators in removing and applying the attachment.

In testimony whereof I affix my signature, in presence of two witnesses.

CHARLES C. ABBOTT.

Witnesses:
 EDITH DIEHL ROBERTSON,
 JESSIE L. DELLERT.